US011921524B2

(12) United States Patent
Modera et al.

(10) Patent No.: US 11,921,524 B2
(45) Date of Patent: Mar. 5, 2024

(54) AUTONOMOUS CONCENTRATION CONTROL SYSTEMS AND METHODS OF CONTROLLING CONCENTRATION OF A GAS OR PARTICLE MIXTURE

(71) Applicant: Aeroseal, LLC, Centerville, OH (US)

(72) Inventors: Mark Peter Modera, Piedmont, CA (US); Vijaykumer Kollepara, Cincinnati, OH (US); Brian S. Farmer, Flagler Beach, FL (US); Chiranjeevi Santosh Deevi, Cincinnati, OH (US); John Frederic Blackwell, Beavercreek, OH (US)

(73) Assignee: Aeroseal, LLC, Centerville, OH (US)

( * ) Notice: Subject to any disclaimer, the term of this patent is extended or adjusted under 35 U.S.C. 154(b) by 156 days.

(21) Appl. No.: 17/230,728

(22) Filed: Apr. 14, 2021

(65) Prior Publication Data

US 2021/0318701 A1 Oct. 14, 2021

Related U.S. Application Data

(60) Provisional application No. 63/009,745, filed on Apr. 14, 2020.

(51) Int. Cl.
*G05D 11/13* (2006.01)
*B05B 12/12* (2006.01)
*G05B 15/02* (2006.01)

(52) U.S. Cl.
CPC ............ *G05D 11/138* (2013.01); *B05B 12/12* (2013.01); *G05B 15/02* (2013.01)

(58) Field of Classification Search
CPC ................................ B05B 12/12; G05B 15/02
USPC ......................................................... 700/283
See application file for complete search history.

(56) References Cited

U.S. PATENT DOCUMENTS

| | | | | |
|---|---|---|---|---|
| 4,664,680 A | * | 5/1987 | Weber ................... | C02F 3/1289 261/36.1 |
| 7,611,667 B2 | * | 11/2009 | Centanni ................ | A61L 2/24 588/300 |
| 8,437,879 B2 | * | 5/2013 | Anderson .............. | G06Q 10/06 56/10.2 D |
| 2007/0253859 A1 | * | 11/2007 | Hill ........................ | A61L 9/22 422/3 |
| 2012/0219462 A1 | * | 8/2012 | Nozaki ................... | A62B 9/02 96/138 |
| 2014/0088768 A1 | * | 3/2014 | Haley ..................... | A61M 1/38 700/283 |
| 2018/0017275 A1 | * | 1/2018 | Merrill ................... | F24F 11/62 |
| 2022/0162070 A1 | * | 5/2022 | Silkoff ................... | A43B 3/34 |

* cited by examiner

*Primary Examiner* — Md Azad
(74) *Attorney, Agent, or Firm* — Dinsmore & Shohl LLP

(57) ABSTRACT

A method of controlling a concentration or range of concentrations of a liquid or gas in an enclosure is provided. The method includes positioning an injection station within the enclosure. the injection station includes a liquid or gas source, a sprayer assembly and a system that delivers the liquid or gas from the liquid or gas source to the sprayer assembly. A concentration level of the liquid or gas in the environment surrounding the injection station is monitored using a sensor and the sensor providing a signal indicative of the concentration level to a controller. The controller controls the flow of the liquid or gas to the sprayer assembly based on the signal.

23 Claims, 4 Drawing Sheets

AUTONOMOUS CONCENTRATION CONTROL SYSTEMS AND METHODS OF CONTROLLING CONCENTRATION OF A GAS OR PARTICLE MIXTURE

CROSS-REFERENCE

The present application claims the benefit of and priority to U.S. Provisional Patent Application No. 63/009,745, titled "Autonomous Concentration Control System," the details of which are incorporated by reference herein.

TECHNICAL FIELD

The present specification generally relates to autonomous concentration control systems and methods of controlling concentration of a gas or particle mixture.

BACKGROUND

Building enclosures often have or form leaks where conditioned air can exit the enclosure to an unconditioned space (e.g., the environment). Such leaks can reduce energy efficiency and indoor environmental quality (IEQ).

Various methods have been tried for locating and sealing air leakage paths. U.S. Pat. No. 10,100,512, incorporated herein by reference, provides methods for sealing leaks in enclosures of buildings or any enclosed structure. The methods disclosed therein utilize a pressure differential and a fog of aerosolized sealant composition to preferentially deposit sealant particles at leak sites.

While the methods disclosed above provide significant advantages over methods that rely on discovering leaks and manually sealing them with caulk, foam or other type of barrier, there remains a need for improved methods of identifying and automatically sealing air leaks in seams and joints, ceiling and wall perforations to improve the air barrier of homes, larger buildings, and other structures as well. Further, there is a need for automatically controlling mixture concentration in order to control properties of the mixture. The principles described herein can be used to overcome challenges of inaccessibility of boilers, multiple points of hidden ducts, pipelines, crawl spaces, attics, and other enclosed structures.

Accordingly, a need exists for an autonomous concentration control system and method of controlling concentration of a gas or particle mixture.

SUMMARY

In one embodiment, a method of controlling a concentration or range of concentrations of a liquid or gas in an enclosure is provided. The method includes positioning an injection station within the enclosure, the injection station includes a liquid or gas source, a sprayer assembly and a system that delivers the liquid or gas from the liquid or gas source to the sprayer assembly. A concentration level of the liquid or gas in the environment surrounding the injection station is monitored using a sensor and providing a signal indicative of the concentration level to a controller. The controller controls the flow of the liquid or gas to the sprayer assembly based on the signal.

In another embodiment, a method of providing an environment of droplets or particles while maintaining a specified concentration of a vapor and/or gas in an enclosure. The method includes positioning an injection station within the enclosure. The injection station includes a material source comprising a droplet and/or particle, a liquid or gas in which the droplet and/or particle is suspended or dissolved, a sprayer assembly and a system that delivers the droplet and/or particle to the sprayer assembly. A concentration level of an environment surrounding the droplets or particles of the droplets or particles of the liquid and/or gas in which the droplets or particles are dissolved is monitored. The monitored concentration is sent to a controller controlling a flow rate to the sprayer assembly of the liquid or gas in which the droplets are suspended or dissolved, based on the monitored concentration level and at a specified setpoint or range.

In another embodiment, an aerosolized sealant particle injection system includes one or more sealant injection stations comprising a material source including sealant suspended or dissolved in a liquid or gas, a sprayer assembly that aerosolizes the sealant and liquid or gas and releases the sealant and liquid or gas to a surrounding environment and a delivery system that delivers the sealant and liquid or gas to the sprayer assembly. A processor and a memory module is communicatively coupled to the processor. Machine readable instructions are stored in the memory module that cause the aerosolized sealant particle injection system to perform at least the following: monitor a signal from a sensor or sensors indicative of a concentration level in a surrounding environment of the liquid or gas in which the sealant is suspended or dissolved and control the delivery of sealant and the liquid or gas to the sprayer assembly so as to maintain the concentration level at a specified setpoint or within a specified range.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to methods and systems for controlling a concentration or range of concentrations of a liquid or gas in an enclosure. The methods and systems include positioning an injection station within the enclosure. The injection station includes a liquid or gas source, a sprayer assembly and a system that delivers the liquid or gas from the liquid or gas source to the sprayer assembly. A concentration level of the liquid or gas in the environment surrounding the injection station is monitored using a sensor and providing a signal indicative of the concentration level to a controller. The controller controls the flow of the liquid or gas to the sprayer assembly based on the signal.

Figure 1A:
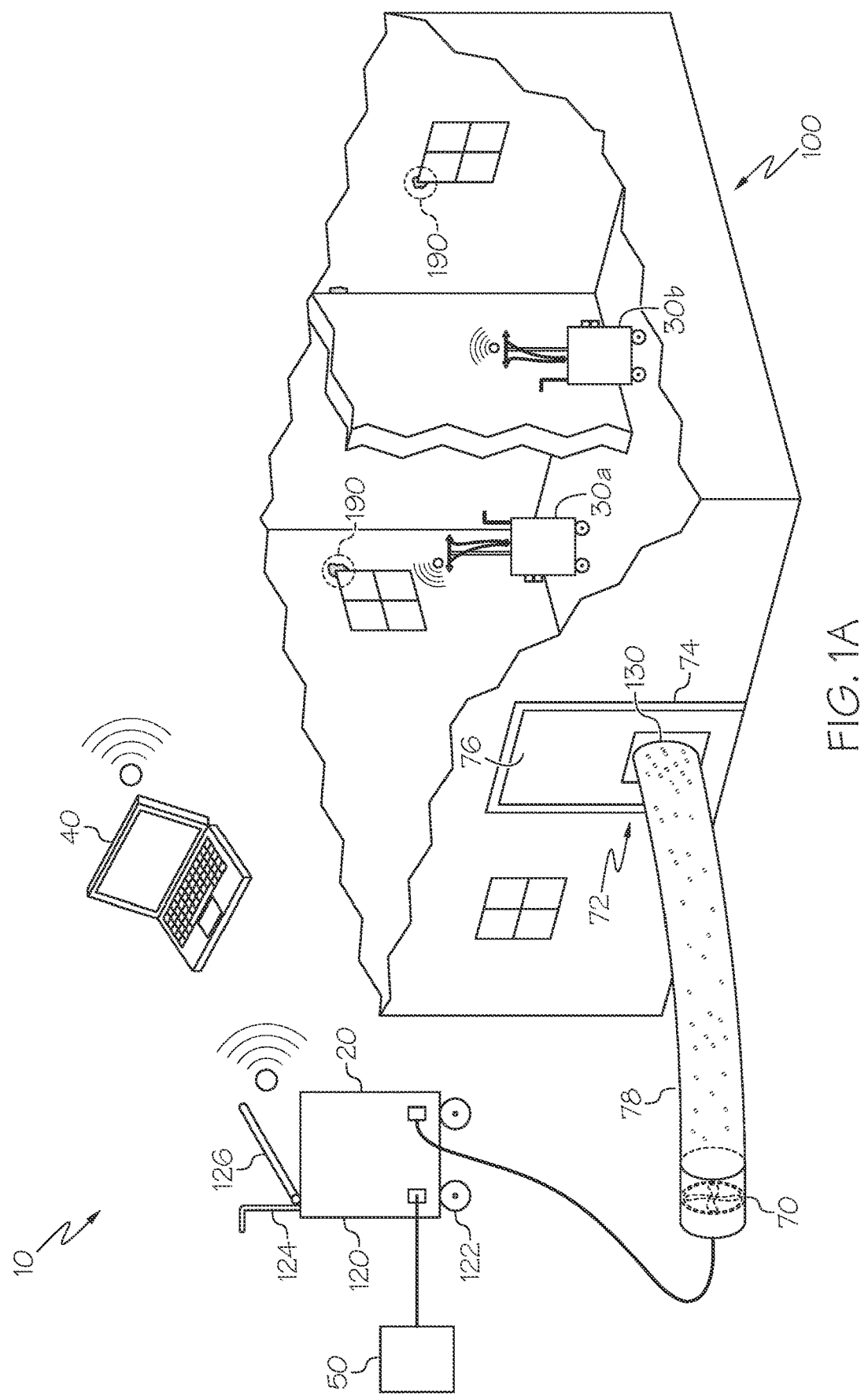
FIG. 1A is a diagrammatic perspective view of an enclosure including a particle injection system, according to one or more embodiment shown and described herein.

Referring to FIG. 1A, an embodiment comprises an autonomous concentration control system 10 including a main control unit 20, one or more discrete sealant application stations 30 (30a, 30b . . . ) or injection stations, and a user interface 40, for example a mobile device such as a laptop or tablet. The system 10 may be powered by an optional generator 50 or may be powered from an in-house source, for example a dryer 240V outlet.

The system 10 may be used to air seal an enclosure 100, such as a house, apartment, or other interior space in which a pressure differential can be maintained. As explained in further detail below, system 10 may be utilized in other applications as well.

In an embodiment, the main control unit 20 incudes a housing 120 to hold various components that can supply power to other system components and send and receive signals for controlling operations and reading environmental conditions. In one embodiment, the housing includes wheels 122 and a handle 124 for mobility. The housing 120 may include a hinged or removable lid 126 to protect components during transport. The design and layout of the housing 120 of the main control unit 20 can be any configuration that accomplishes the purposes described herein. The main control unit 20 can be operated outside of the enclosure 100 to be sealed, while each discrete sealing station 30 is operated inside the enclosure 100.

Figure 1B:
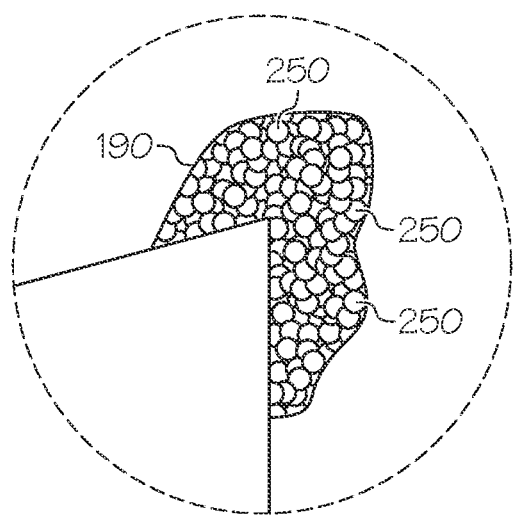
FIG. 1B illustrates a detail view of an area of FIG. 1A, according to one or more embodiments, shown and described herein.
Figure 1C:
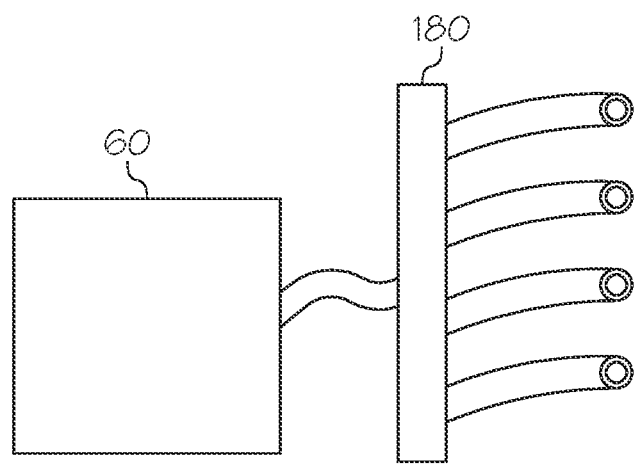
FIG. 1C illustrates a nozzle apparatus and compressor, according to one or more embodiment shown and described herein.

A source of compressed air, such as compressor 60 (FIG. 1C), supplies compressed air to system 10 that is used to aerosolize sealant material as described in greater detail below. It is envisioned that other methods to aerosolize sealant material may be utilized (airless nozzles, portable compressors, for example) within the scope of the present disclosure.

The system 10 uses a fan 70 to create a pressure differential in an enclosure 100 as will be explained in greater detail below. The pressure differential is measured with a manometer housed in the main control unit 20. In one embodiment, fan 70 is a centrifugal fan selected to provide sufficient air flow while minimizing or preventing back flow of sealant material being supplied by the system 10. The system 10 may include one or more heaters 130 for optionally heating air flowing into the enclosure.

The system 10 includes wireless capability to send and receive information between the main control unit 20 and the user interface 40. The system 10 is also capable of wirelessly sending and receiving information between the main control unit 20 and the sealant application stations 30. In some embodiments, the system 10 has mesh network capability so that signals can also be sent between sealant application stations 30. Other features included in system 10 are GSM and GPS capability.

Figure 2:
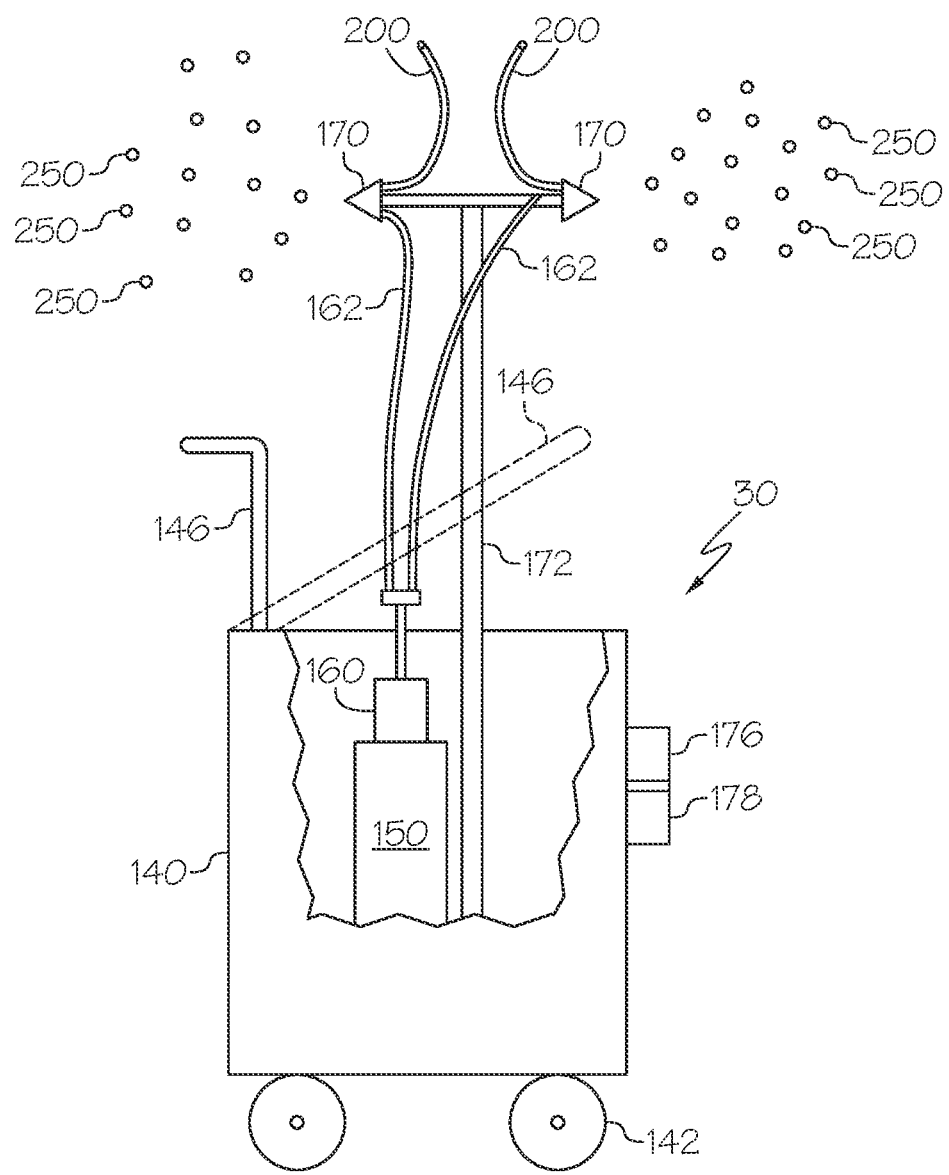
FIG. 2 illustrates a sealing station for the particle projection system of FIG. 1, according to one or more embodiments shown and described herein.

Referring also to FIG. 2, each sealing station 30 may be a rechargeable, battery-operated unit that is enabled to provide aerosolized sealant to a local region of the enclosure 100. The sealing station 30 includes a housing 140 that may also include wheels 142, handle 144 and hinged or removable lid 146 for easy mobility and access. The housing 140 is configured to hold a container 150 of sealant material in liquid, non-aerosolized form. The sealing station 30 is equipped with a pump assembly 160 that is able to deliver the sealant material to one or more nozzles 170 carried on the housing 140 where the liquid sealant material (i.e., sealant solids carried in water or other solvent) interfaces with compressed air from compressor 60 and aerosolizes to become a fog of sealant material.

In one embodiment, the sealing station 30 has two nozzles 170, each fed by pump assembly 160, and each with a discrete line of compressed air. Air from the compressor 60 may be directed to a manifold 180 and from there to a designated nozzle 170 (FIG. 1C) of a sprayer assembly. The nozzle design cooperates with the compressed air to provide aerosolized, sealant particles (having excess liquid such as water or other solvent removed). In one embodiment, each nozzle 170 is mounted on an adjustable stand 172 such that the height and direction of the nozzle 170 can be arranged to provide optimal sealant coverage in the enclosure 100.

During operation, a pressure differential exists between the interior and exterior of the enclosure 100, such that the particles of aerosolized sealant material are carried by air moving toward leak sites 190 in the enclosure 100. Sealant particles remain sufficiently tacky to adhere to the edges of the leaks and to each other to form a seal (air barrier) at the leak sites 190. In one embodiment, the tackiness of the sealant particles diminishes over time such that particles coalesce to form a seal at a leak site, but the sealant is not sticky when touched.

The sealing station 30 includes a temperature sensor 176 and a humidity sensor 178 to read temperature and humidity (absolute or relative) in the local region around the sealing station 30. The humidity sensor 178 is used to monitor a concentration level of water in the environment. Other factors indicative of concentration levels may be monitored, such as dew point, wet-bulb temperature and various chemical substances delivered to the air, for example, using a chemical sensor. During operation, the parameters determine the concentration level of moisture (water) or other substances in the air in the local region around the sealing station 30. Because the sealant material is initially in liquid form and is dried as it is aerosolized, the excess moisture is imparted to the air surrounding the sealing station 30. Thus, during operation of system 10, one result of sealant material being distributed to the enclosure 100, is an increase in humidity, as sensed by sensor 178. The pump assembly 160 is controlled to operate responsive to the reading of sensor 178. If a humidity value reaches a threshold value (e.g., range or point values), the pump assembly 160 will automatically shut off. By sensing the change in humidity and controlling the pump assembly 160, the concentration of sealant material in the enclosure 100 can be controlled. Thus, excess sealant material, as determined by local humidity conditions, is prevented from depositing in the enclosure 100. Without controlling the pump assembly responsive to the sensed humidity conditions, excess sealant material can fall and puddle around the sealing station 30 once the air is saturated with moisture. The control of sealant material allows for optimizing sealant application stations 30 rates, the time and sealant required for air sealing an enclosure, and control of the drying process for the sealant particles while minimizing sealant wastage and unwanted sealant deposition.

System 10 may include a plurality of sealant application stations 30a, 30b (e.g., two, three, four, five, six, 10 or more) positioned in spaced relationship around the enclosure 100. It is envisioned that having one sealing station for every 500 square feet of the enclosure to seal will give optimal results. Each sealing station 30 senses the local temperature and relative humidity. If for example, the local conditions at a first sealing station 30a reach the threshold value, the pump assembly will shut off and no further sealant material will be discharged. Each sealing station 30a, 30b, operates independently of the other. Thus, a second sealing station 30b, remote from the first sealing station 30a, can continue to operate according to the local conditions sensed by its relative humidity sensor.

Each of the sealant application stations 30 are connected via the mesh network and send information to the main control unit 20, which communicates with the user interface 40 so that operation of the system 10 and each sealing station 30 can be monitored and controlled.

Figure 3:
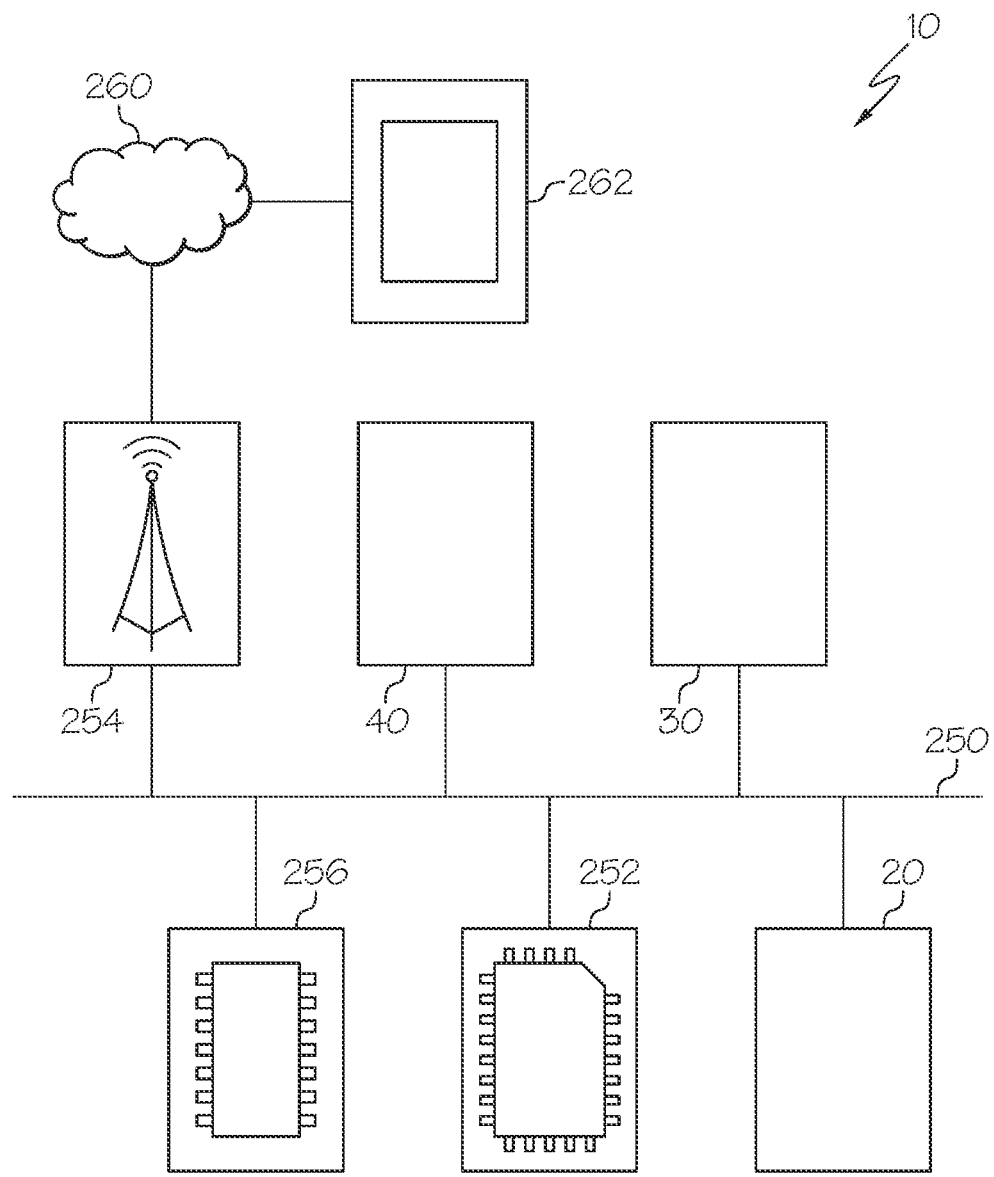
FIG. 3 illustrates a control system for the particle injection system of FIG. 1A, according to one or more embodiments shown and described herein.

As an example, referring now to FIG. 3, the control system 10 is illustrated schematically. The control system 10 includes a communication path 250, a processor 252, a memory module 256, sealant application stations 30 with temperature and humidity sensors 176, 178, and a user input device that may be the computer 40. The control system 10 may further include the main control unit 20 and network interface hardware 254.

The control system 10 includes the communication path 250 that provides data interconnectivity between various modules disposed within the control system 10. Specifically, each of the modules can operate as a node that may send and/or receive data. In some embodiments, the communication path 250 includes a conductive material that permits the transmission of electrical data signals to processors, memories, sensors, and actuators throughout the control system 10. In some embodiments, the communication path 250 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The control system 10 includes the processor 252 communicatively coupled with the memory module 256 over the communication path 250. The processor 252 may include any device capable of executing machine-readable instructions stored on a non-transitory computer-readable medium. The processor 252 may include one or more processors. For example, each of the sealant application stations 30 and the main control unit 20 may include processors 252 and memory modules 256. Accordingly, each processor 252 may include a controller, an integrated circuit, a microchip, a computer, and/or any other computing device.

The memory module 256 is communicatively coupled to the processor 252 over the communication path 250. The memory module 256 may be configured as volatile and/or nonvolatile memory and, as such, may include random access memory (including SRAM. DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the any of the sealant application stations 30 and main control unit 20 and/or external to the sealant application stations 30 and main control unit 20. The memory module 256 may be configured to store one or more pieces of logic, as described herein. The memory module 256 may include one or more memory modules. The embodiments described herein may utilize a distributed computing arrangement to perform any portion of the logic described herein.

Embodiments of the present disclosure include logic stored on the memory module 256 that includes machine-readable instructions and/or an algorithm written in any programming language of any generation (e.g., 1GL, 2GL, 3GL, 4GL, and/or 5GL) such as, machine language that may be directly executed by the processor 204, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

The control system 10 includes the user input device 40 coupled to the communication path 250 such that the communication path 250 communicatively couples the user input device 40 to other modules of the control system 10. The user input device 30 may be controlled manually. In some embodiments, there may be multiple user input devices. The user input device 40 may be any device capable of transforming mechanical, optical, or electrical signals into a data signal capable of being transmitted with the communication path 250. Specifically, the user input device 40 may include any number of movable objects that transform physical motion into a data signal that can be transmitted over the communication path 250. The user input device 40 may allow a user to control operation of the control system 10.

In some embodiments, the control system 10 further includes network interface hardware 254 for communicatively coupling the control system 10 with a network 260. The network interface hardware 254 can be communicatively coupled to the communication path 250 and can be any device capable of transmitting and/or receiving data via the network 260. Accordingly, the network interface hardware 254 can include a communication transceiver for sending and/or receiving any wired or wireless communication. For example, the network interface hardware 254 may include an antenna, a modem. LAN port, Wi-Fi card, WiMax card, mobile communications hardware, near-field communication hardware, satellite communication hardware and/or any wired or wireless hardware for communicating with other networks and/or devices. In one embodiment, the network interface hardware 254 includes hardware configured to operate in accordance with the Bluetooth wireless communication protocol. In another embodiment, network interface hardware 254 may include a Bluetooth send/receive module for sending and receiving Bluetooth communications to/from a mobile device 262.

The control system 10 may communicate, through the network interface hardware 254, with the network 260 to communicatively couple the control system 10 with the mobile device 262. In one embodiment, the network 260 is a personal area network that utilizes Bluetooth technology to communicatively couple the control system 10 and the mobile device 262. In other embodiments, the network 260 may include one or more computer networks (e.g., a personal area network, a local area network, or a wide area network), cellular networks, satellite networks and/or a global positioning system and combinations thereof. Accordingly, the control system 10 can be communicatively coupled to the network 260 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA. Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX. UMTS, CDMA, and GSM.

In some embodiments, the mobile device 262 may be included as a user input device. The mobile device 262 may include a processor and a memory module. The processor can execute logic to communicate with the control system 10 in order to facilitate sending instructions to the control system 10 from the mobile device 262 to control the control system 10. The mobile device 262 may be configured with wired and/or wireless communication functionality for communicating with the control system 10. In embodiments described herein, the mobile device 262 may include mobile phones, smartphones, personal digital assistants, dedicated mobile media players, mobile personal computers, laptop computers, and/or any other mobile devices capable of being communicatively coupled with the control system 10. It is noted, that in this embodiment, the control system 10 may communicate with the mobile device 262 even while the mobile device 262 is remote from the sealant application stations 30 and main control unit 20. In this way, the control system 10 may be controlled with the mobile device 262 remotely.

A process for setting up system 10 and performing a sealing event is now described.

A. Preparing the Enclosure

Referring to FIG. 1A, any intentional openings in the enclosure 100 should be sealed/masked prior to system start up. Additionally, any visible unintentional openings/holes greater than about ⅝" should be manually sealed with caulk or other sealing material. The system 10 may be used to seal any enclosure 100 but optimal results in sealing homes under construction can be achieved either before drywall phase (rough in) or after drywall phase but before finishing. In operation, horizontal surfaces with finished surfaces should be covered. A main opening to the enclosure 100, such as a doorway, is fitted with a blower door assembly 72 including a frame 74 and cloth 76. Although referred to as a blower door assembly 72, in one embodiment, a typical blower door assembly is modified in that the fan 70 is not mounted in the blower door assembly 72 but is located some distance away. In one embodiment a conduit 78 extends from the fan 70 to the blower door assembly 72 to direct the flow of air from the fan to the enclosure 100 where the air is optionally heated by one or more heaters 130 that may be mounted in a frame to fit the opening in the blower door cloth. Separating the fan 70 some distance from the enclosure is intended to minimize the back flow of sealant material. The manometer is arranged to enable reading the pressure differential from outside and inside the enclosure. In one embodiment, if used, the heater(s) 130 can be powered through connecting with the main control unit. In one embodiment, the one or more heaters 130 can be controlled with a heater selection algorithm to provide heater selection and control.

The heater selection algorithm can allow addition of heat to a system to increase dispensing of sealant material without driving the relative humidity too low and risking the deposition of overly dry sealant material. The algorithm iteratively examines a level of added heat and calculates the quantity of sealant material that could be dispensed based on a target humidity, and the temperature, relative humidity, and flow rate of fan air entering the enclosure 100. If a certain level of added heat would allow all sealant station to begin ejecting sealant, then that heat level is chosen. Otherwise a lower level of added heat is examined in turn until a working level is discovered or a zero added heat is reached.

B. Preparing the Sealing Stations

The battery for each sealing station 30 desired to be used in the enclosure 100 should be sufficiently charged to operate the sensors, pump assembly and a network card for communicating with the main control unit and other sealing stations through the local mesh network. A container 150 of sealant material is positioned within housing 140. The nozzles 170 are positioned as desired. The sealant material and the nozzles 170 are placed in functional arrangement with the pump assembly 160 such that during operation the liquid sealant material is delivered from the sealant container 150 to the nozzle 170. A compressed air line 200 is placed in functional arrangement with each nozzle 170 such that during operation the compressed air interacts with the liquid sealant material to create a fog of aerosolized sealant particles as described above.

C. Pre-Sealing Operation

The main control unit 20 is powered up, either using a generator or in-house power source. The user interface 40 is powered up and an operator can verify that each sealing station 30 is able to send and receive signals and a check may be made of the sensor readings. Compressed air is fed to each nozzle 170 to enable aerosolization of the sealant material. The fan 70 is used to create a pressure differential in the enclosure 100 as measured by manometer 220. Initial conditions in the enclosure 100, such as a measure of the leakage in the enclosure is determined.

D. Sealing Operation

At each sealing station 30, the pump assembly 160, responsive to controls, delivers sealant material to the nozzle 170 where it is met with compressed air to aerosolize and dry the sealant material. The sealant particles are carried by the air toward leak sites 190 where the sealant particles 250 (FIG. 1B) adhere to the edges of the leaks and to each other to form an air barrier. If the humidity sensor 178 at any of the sealing stations, such as sealing station 30a, senses a local humidity at the predetermined threshold (e.g., setpoint or range), thepump assembly 160 will automatically shut off. The system 10 thus uses feedback from the humidity sensor 178 to determine that the sealing station 30a has imparted sufficient sealant to the local area.

Another sealing station, for example sealing station 30b, operates autonomously from sealing station 30a, and can continue to deliver sealant material to its local area. Progress of the overall sealing of enclosure 100 is monitored and controlled until a desired level of air sealing is attained.

E. Post Seal

In some embodiments, system 10 is configured to run a post-seal analysis of the air leakage in the enclosure 100 and can provide a certificate of the results of the sealing operation. In one embodiment, data from the sealing operation may be stored on the main control unit 20 and/or uploaded to a remote location. In one embodiment, system 10 is configured to automatically upload data about a sealing event upon completion.

In some embodiments, the total sealant ejected by each sealing station (sealant application stations 30). e.g., 30a can be compared with the sealant ejected by another sealing station, e.g., 30b to determine where sealant application stations 30 might be optimally placed in a similar application (e.g., another enclosure with a similar floorplan), so as to shorten the time required for the sealing process. For example, if a sealing station 30a ejected significantly less sealant than sealing station 30b, then in a subsequent sealing event, sealing station 30a may be positioned closer to sealing station 30b. This is just one example of how information from each discrete sealing station 30 may be utilized to optimize the sealing events.

The above-described systems include a plurality of modular, autonomously operable stations, where each modular station has a sensor able to monitor and control an output of material from the station responsive to a sensed condition. Each modular station can be configured to communicate with any other modular station as well as a main control unit.

The systems include at least one modular station enabled to operate in spatial relationship to a main control unit via wireless connectivity. The modular station includes a housing configured to hold a container of material to be ejected, such as sealant material, at least one nozzle assembly, means to deliver the material from the container to the nozzle assembly, and a sensor able to sense a local environmental condition whereby the means to deliver the material operates based on the sensed local environmental condition.

The systems may be configured such that the number of modular stations that may be used to air seal an enclosure is based on a square footage of the enclosure (and/or total leakage of the enclosure) and may be scalable to accommodate enclosures with a large square footage.

The systems may be configured such that each modular station provides closed loop concentration control (e.g., humidity control) for water-based sealant particle size formation. Closed-loop control means that the sealant application stations 30 flow rate is determined based on measured concentration, which can be performed by each sealing station with its own closed-loop control sensors, calculations and actuation, using any number of sealing stations. One embodiment can have the sealing stations do their own calculations, whereas another embodiment can have the calculations performed by a main control unit. The preferred embodiment has the closed-loop control calculations performed locally at each sealing station.

The system may be configured to control sealant flow rate based on calculated concentration determined by the local humidity. While each independent sealing station provides closed-loop control, the information from each sealing station contributes to system-wide open loop control. For example, an open loop check can be made on operation and connectivity of each sealing station while each independent sealing station operates with closed-loop control, or an open-loop check on the total amount of sealant that can be sealant application stations 30 by the full collection of sealing stations, thereby flagging independent control faults. Thus, the overall sealing process for an enclosure can be monitored and controlled, and the local region at each sealing station is monitored and controlled.

The systems can be configured such that each modular station is independently operable to control local humidity which in turn can affect sealant particle size.

The principles contained herein may be used to control the concentration of any vapor or gas using closed loop control using a sensed environmental condition.

The systems may be configured such that the dying process for the sealant/solvent mixture may be controlled by controlling a concentration of the sealant or other material in the environment. For water, the humidity may be measured. Other solvent parameters can be measured and/or controlled.

The systems may be configured so that each sealing station can measure one or more environmental conditions (e.g., humidity, pressure) to monitor the progress of sealing at each discrete location and provide information related to the overall sealing event. For example, sealing stations may be located in different areas of branched ductwork. Pressure distribution analysis at the site of each sealing station and across the entire enclosure during sealing can be used.

In one embodiment, post-sealing or real-time analysis of the relative amount of sealant application stations 30 by each sealing station can be used to optimize the locations of sealing stations. For example, if one sealing station is sealant application stations 30 little or no sealant that station should be moved to a location at or near other sealing stations that are sealant application stations 30 much more sealant, as there is a greater need in locations that are calling for more sealant application stations 30.

In some embodiments, remote stations can measure absolute or differential pressure at each location to give indication of where sealing is occurring, for example sealing stations in different areas of branched duct systems.

In some embodiments, sensed humidity can be used to indicate where sealing is occurring.

Some embodiments include a heater selection algorithm to facilitate the maximum addition of heat to a system so as to facilitate the maximum flow rate of sealant, choosing the heat level so as to not drive the relative humidity too low and risking the deposition of overly dry sealant in the leakage. The upper limit on the amount of heat that can be added is determined by the maximum sealant application stations 30 rate that the installed number of sealing stations can produce. At one end of spectrum (e.g. on a cold humid day), the algorithm will turn on all heaters, to maximize the sealant application stations 30 rate. At the other end of the spectrum (e.g. a hot, dry day), the algorithm will turn on fewer, and potentially no heaters, to avoid a low indoor relative humidity caused by inadequate sealant/water sealant application stations 30 capacity. The algorithm does this by examining the possibility of adding heat to the system, starting with the highest possible level of added heat and then examining the indoor humidity produced, based upon the temperature and relative humidity of the outside air being blown into the enclosure, and the flow rate of the outside air being blown into the enclosure. If the indoor relative humidity under those conditions is lower than the target value, the control algorithm will lower the level of added heat to the next lower level, repeating this process until either the target humidity level is predicted to be achieved, or it potentially reaches the lowest level of no added heat at all. If the algorithm lands at no added heat, it suggests adding additional sealing stations, or alternately, adding straight humidification.

In some embodiments, a main control unit communicates to the remote sealing stations and/or measurement stations through a computer network, such as a wireless mesh network. In some embodiments, the remote devices consist of sealing stations, but other types of remote devices are possible, including sensor packs for measuring temperature and humidity, sensor packs for measuring compressed-air or sealant pressure, and fan controllers combined with manometers for providing remote control of booster fans. The communications consist of sensor readings coming from remote devices, and actuation commands being sent out to the remote devices. The main control unit can send a request to any remote device to send a regular heartbeat communication to allow the main control unit to judge when a remote device has gone out of communication.

The main actuation commands for the sealing station type of remote devices are the commands to begin sealing and to stop sealing. The command to begin sealing includes a range of desired relative humidity. The sealing station will dispense sealant until the local relative humidity reaches the upper limit of the range and the turn off until the lower range of humidity is reached. This can be achieved either by variable speed sealant application stations 30, duty cycling of constant speed sealant application stations 30, or on-off control of constant or variable-speed sealant application stations 30 based upon a dead-band, with or without anticipation.

In some embodiments, a failsafe prevents any sealing station from dispensing sealant continuously without reporting back to the main control unit. The command to dispense sealant is time limited to a given number of seconds. As the sealing station is nearing the end of the sealant dispensing time, the sealing station sends a countdown to the main control unit to inform it that sealing time is running out. If sealing is still in progress, the main control unit can then send a new command to dispense sealing to ensure uninterrupted sealing. If the sealing station does not get a new command to continue sealing, the sealing station will stop dispensing sealant automatically.

Once the operator has sent the command to begin dispensing sealant to the sealing stations through the main control unit, the sealant stations will continue dispensing sealant until a command to stop is sent through the network, the sealing station's battery charge becomes too low, or the sealing station loses communication with the main control unit for some predefined time period. In a dead-band control embodiment, the sealing stations also pause sealant application stations 30 temporarily as needed when the ambient humidity exceeds or approaches the upper limit of the requested range.

Clause 1: A method of controlling a concentration or range of concentrations of a liquid or gas in an enclosure, the method comprising: positioning an injection station within the enclosure, the injection station comprising: a liquid or gas source; a sprayer assembly; and a system that delivers the liquid or gas from the liquid or gas source to the sprayer assembly; monitoring a concentration level of the liquid or gas in the environment surrounding the injection station using a sensor and providing a signal indicative of the concentration level to a controller; and the controller controlling the flow of the liquid or gas to the sprayer assembly based on the signal.

Clause 2: The method of any of the above clauses, wherein the liquid or gas source comprises a liquid, wherein the liquid is water.

Clause 3: The method of any of the above clauses, wherein the concentration level is relative humidity.

Clause 4: The method of any of the above clauses, wherein the controller detecting the concentration level based on absolute humidity, dew point temperature and/or wet-bulb temperature.

Clause 5: The method of any of the above clauses, wherein the liquid or gas source comprises a liquid, wherein the liquid comprises an organic solvent.

Clause 6: The method of any of the above clauses, wherein the liquid or gas source comprises a liquid, wherein the liquid comprises water and organic solvent.

Clause 7: The method of any of the above clauses, wherein the liquid or gas source comprises a liquid, wherein the liquid comprises a combination of solvents.

Clause 8: A method of providing an environment of droplets or particles while maintaining a specified concentration of a vapor and/or gas in an enclosure. The method includes positioning an injection station within the enclosure. The injection station includes a material source comprising a droplet and/or particle, a liquid or gas in which the droplet and/or particle is suspended or dissolved, a sprayer assembly and a system that delivers the droplet and/or particle to the sprayer assembly. A concentration level of an environment surrounding the droplets or particles of the droplets or particles of the liquid and/or gas in which the droplets or particles are dissolved is monitored. The monitored concentration is sent to a controller controlling a flow rate to the sprayer assembly of the liquid or gas in which the droplets are suspended or dissolved, based on the monitored concentration level and at a specified setpoint or range.

Clause 9: The method of any of the above clauses, wherein the liquid or gas comprises a liquid, wherein the liquid is water.

Clause 10: The method of any of the above clauses, wherein the concentration level is relative humidity.

Clause 11: The method of any of the above clauses, wherein the controller detecting the concentration level based on absolute humidity, dew point temperature and/or wet-bulb temperature.

Clause 12: The method of any of the above clauses, wherein the liquid or gas comprises a liquid, wherein the liquid comprises an organic solvent.

Clause 13: The method of any of the above clauses, wherein the liquid or gas comprises a liquid, wherein the liquid comprises water and organic solvent.

Clause 14: The method of any of the above clauses, wherein the liquid or gas comprises a liquid, wherein the liquid comprises a combination of solvents.

Clause 15: An aerosolized sealant particle injection system includes one or more sealant injection stations comprising a material source including sealant suspended or dissolved in a liquid or gas, a sprayer assembly that aerosolizes the sealant and liquid or gas and releases the sealant and liquid or gas to a surrounding environment and a delivery system that delivers the sealant and liquid or gas to the sprayer assembly. A processor and a memory module is communicatively coupled to the processor. Machine readable instructions are stored in the memory module that cause the aerosolized sealant particle injection system to perform at least the following: monitor a signal from a sensor or sensors indicative of a concentration level in a surrounding environment of the liquid or gas in which the sealant is suspended or dissolved and control the delivery of sealant and the liquid or gas to the sprayer assembly so as to maintain the concentration level at a specified setpoint or within a specified range.

Clause 16: The system of any of the above clauses, wherein the liquid is water.

Clause 17: The system of any of the above clauses, wherein the concentration level is relative humidity.

Clause 18: The system of any of the above clauses, wherein the processor detects the concentration level based on absolute humidity, dew point temperature and/or wet-bulb temperature.

Clause 19: The system of any of the above clauses, wherein the liquid comprises an organic solvent.

Clause 20: The system of any of the above clauses, wherein the liquid comprises water and organic solvent.

Clause 21: A method of sealing leaks in an enclosure, the method comprising: locating a sealant application station at a position within the enclosure, the sealant application station comprising: a liquid sealant source; a nozzle assembly; and a pump that delivers liquid sealant toward the nozzle assembly; wherein the nozzle assembly comprises a nozzle that ejects aerosolized sealant particles into a surrounding environment; aerosolizing the liquid sealant using compressed air at the sealant application station and releasing aerosolized sealant particles to the surrounding environment using the nozzle; monitoring a humidity level of the surrounding environment using a humidity sensor and providing a signal indicative of the humidity level to a controller; and the controller controlling the pump delivering the liquid sealant to the compressed air based on the signal.

Clause 22: The method of any of the above clauses comprising locating multiple sealant application stations at respective positions within the enclosure.

Clause 23: The method of any of the above clauses, wherein each multiple sealant application stations comprises: a respective liquid sealant source; a respective nozzle assembly; a respective pump that delivers liquid sealant toward the respective nozzle assembly; and a respective compressed air source that is in communication with the respective nozzle assembly, wherein liquid is removed from liquid sealant by compressed air in the respective nozzle assembly, the respective nozzle assembly comprising a respective nozzle that ejects aerosolized sealant particles into a respective surrounding environment.

Clause 24: The method of any of the above clauses comprising locating the multiple sealant application stations a pre-selected distance apart from each other.

Clause 25: The method of any of the above clauses, wherein the humidity sensor and the controller are carried by the sealant application station.

Clause 26: The method of any of the above clauses further comprising the controller sending humidity information to a main control unit.

Clause 27: The method of any of the above clauses further comprising: monitoring a temperature of the surrounding environment using a temperature sensor and providing a temperature signal indicative of the temperature to the controller; and the controller controlling the pump delivering the liquid sealant to the compressed air based on the temperature signal.

Clause 28: The method of any of the above clauses, wherein the sealant application station comprises: a housing in which the liquid sealant source is located; and wheels connected to the housing that roll along a floor of the enclosure when moving the one or more sealant application stations.

Clause 29: An aerosolized sealant particle concentration control system comprising: one or more sealant application stations comprising: a liquid sealant source; a nozzle assembly; a pump that delivers liquid sealant toward the nozzle assembly; and a compressed air source that is in communication with the nozzle assembly, wherein, the nozzle assembly comprising a nozzle that ejects aerosolized sealant particles into a surrounding environment, the removed liquid being ejected into the surrounding environment; and a processor and a memory module communicatively coupled to the processor; and machine readable instructions stored in the memory module that cause the aerosolized sealant particle concentration control system to perform at least the following when executed by the processor: monitor a signal from a humidity sensor, the signal being indicative of a humidity level in the surrounding environment; and slow the pump that delivers the liquid sealant if the humidity level is above a predetermined threshold.

Clause 30. The control system of any of the above clauses, wherein the one or more sealant application stations comprise the processor and the memory module.

Clause 31. The control system of any of the above clauses further comprising a main control unit in communication with the one or more sealant application stations.

Clause 32. The control system of any of the above clauses comprising multiple sealant application stations, wherein each sealant application station comprises: a respective liquid sealant source; a respective nozzle assembly; a respective pump that delivers liquid sealant toward the respective nozzle assembly; and a respective compressed air source that is in communication with the respective nozzle assembly, wherein liquid is removed from the liquid sealant by compressed air in the respective nozzle assembly, the respective nozzle assembly comprising a respective nozzle that ejects aerosolized sealant particles into a surrounding environment, the removed liquid being ejected separately from the aerosolized sealant particles into the surrounding environment; and a respective processor and a respective memory module communicatively coupled to the respective processor; and machine readable instructions stored in the respective memory module that causes the aerosolized sealant particle concentration control system to perform at least the following when executed by the respective processor: monitor a signal from a respective humidity sensor, the signal being indicative of a humidity level in the surrounding environment; and slow the respective pump that delivers the liquid sealant if the humidity level detected by the respective humidity sensor is above a predetermined threshold.

Clause 33: The control system of any of the above clauses, wherein the machine readable instructions stored in the memory module causes the aerosolized sealant particle concentration control system to perform at least the following when executed by the processor: monitor a signal from a temperature sensor, the signal being indicative of a temperature in the surrounding environment; and stop the pump that delivers the liquid sealant in the temperature detected by the temperature sensor is above a predetermined threshold.

Clause 14: The control system of any of the above clauses, wherein the one or more sealant application stations comprise: a housing in which the liquid sealant source is located; and wheels connected to the housing that roll along a floor of the enclosure when moving the one or more sealant application stations.

Clause 15: A method of providing an aerosolized sealant to an enclosure, the method comprising: locating multiple sealant application stations at positions within the enclosure, the multiple sealant application stations each comprising a respective pump that delivers liquid sealant to a respective nozzle assembly; removing liquid from the liquid sealant using compressed air at the nozzle assemblies and releasing aerosolized sealant particles using nozzles of the nozzle assemblies to respective surrounding environments; monitoring humidity levels of the respective surrounding environments using humidity sensors carried by the multiple sealant application stations and providing signals indicative of the humidity levels to controllers carried by the sealant application stations; and at least one controller controlling the respective pump of the respective sealant application station based on the respective signal.

Clause 36. The method of any of the above clauses comprising locating the multiple sealant application stations a pre-selected distance apart from each other.

Clause 37: The method of any of the above clauses further comprising the controllers sending humidity information to a main control unit.

Clause 38: The method of any of the above clauses further comprising: monitoring temperature of the respective surrounding environments using temperature sensors carried by the multiple sealant application stations and providing temperature signals indicative of the temperatures to controllers;

and at least one controller controlling the respective pump of the respective sealant application station based on the temperature signal.

Clause 39: The method of claim any of the above clauses, wherein the multiple sealant application stations each comprise: a housing in which a liquid sealant source is located; and wheels connected to the housing that roll along a floor of the enclosure when moving the one or more sealant application stations.

Clause 40: The method of any of the above clauses further comprising comparing amounts of liquid sealant used by each of the multiple sealant application stations.

Clause 41 The method or system of any of the above clauses, wherein the injection station communicates with another injection station and/or central control and/or monitoring station.

While embodiments are described with relation to delivering a sealant material to form an air barrier for an enclosure, it is envisioned that the concept of using a humidity or other sensed condition to determine and control an amount of aerosolized material being delivered can be applied to other situations as well, such as, for example, controlling an amount of odorant used to enhance ambient conditions in a retail setting.

It is noted that the terms "substantially" and/or "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of controlling a concentration or range of concentrations of a liquid or gas in an enclosure, the method comprising:
    positioning an injection station within the enclosure, the injection station comprising:
        a liquid or gas source;
        a sprayer assembly; and
        a delivery system that delivers the liquid or gas from the liquid or gas source to the sprayer assembly;
    monitoring a concentration level of the liquid or gas in a local environment surrounding the injection station using a sensor located at a location outside of a housing of the injection station and exposed to the local environment to directly monitor the concentration level at the location outside of the housing and the sensor providing a signal indicative of the concentration level in the local environment to a controller; and
    the controller controlling the flow of the liquid or gas to the sprayer assembly based on the signal.

2. The method of claim 1, wherein the liquid or gas source comprises a liquid, wherein the liquid is water.

3. The method of claim 2, wherein the controller detecting the concentration level based on relative humidity.

4. The method of claim 1, wherein the controller detecting the concentration level based on absolute humidity, dew point temperature and/or wet-bulb temperature.

5. The method of claim 1, wherein the liquid or gas source comprises a liquid, wherein the liquid comprises a solvent.

6. The method of claim 1, wherein the liquid or gas source comprises a liquid, wherein the liquid comprises water and a solvent other than water.

7. The method of claim 1, wherein the liquid or gas source comprises a liquid, wherein the liquid comprises a sealant and solvent mixture comprising one or more solvents.

8. The method of claim 1, wherein the injection station is a first injection station, wherein the first injection station is configured to communicate with a second injection station and/or central control and/or monitoring station.

9. A method of providing an environment of droplets or particles while maintaining a specified concentration of a vapor and/or gas in an enclosure, the method comprising:
    positioning an injection station within the enclosure, the injection station comprising:
        a material source comprising a droplet and/or particle;
        a liquid or gas in which the droplet and/or particle is suspended or dissolved;
        a sprayer assembly; and
        a system that delivers the droplet and/or particle to the sprayer assembly;
    monitoring a concentration level of the environment surrounding the droplets or particles of the droplets or particles of the liquid and/or gas in which the droplets or particles are suspended or dissolved using a sensor located outside of a housing of the injection station and exposed to the environment to directly monitor the concentration level outside of the housing; and
    sending the monitored concentration to a controller controlling a flow rate to the sprayer assembly of the liquid or gas in which the droplets are suspended or dissolved, based on the monitored concentration level and at a specified setpoint or range.

10. The method of claim 9, wherein the liquid or gas comprises a liquid, wherein the liquid is water.

11. The method of claim 10, wherein the controller detecting the concentration level based on relative humidity.

12. The method of claim 9, wherein the controller detecting the concentration level based on absolute humidity, dew point temperature and/or wet-bulb temperature.

13. The method of claim 9, wherein the liquid or gas comprises a liquid, wherein the liquid comprises a solvent.

14. The method of claim 9, wherein the liquid or gas comprises a liquid, wherein the liquid comprises water and a solvent other than water.

15. The method of claim 9, wherein the liquid or gas comprises a liquid, wherein the liquid comprises a sealant and solvent mixture comprising one or more solvents.

16. The method of claim 9, wherein the injection station is a first injection station, the first injection station is configured to communicate with a second injection station and/or a central control and/or monitoring station.

17. An aerosolized sealant particle injection system comprising:
    one or more sealant injection stations comprising:
        a material source comprising sealant suspended or dissolved in a liquid or gas;
        a sprayer assembly that aerosolizes the sealant and liquid or gas and releases the sealant and liquid or gas to a surrounding environment;
        a delivery system that delivers the sealant and liquid or gas to the sprayer assembly;

a processor and a memory module communicatively coupled to the processor;

machine readable instructions stored in the memory module that cause the aerosolized sealant particle injection system to perform at least the following:

monitor a signal from a sensor or sensors indicative of a concentration level in the surrounding environment of the liquid or gas in which the sealant is suspended or dissolved, the sensor or sensors located outside a housing of the one or more sealant injection stations and exposed to the local environment to directly monitor the concentration level outside the housing of the one or more sealant injection stations; and control the delivery of sealant and the liquid or gas to the sprayer assembly so as to maintain the concentration level at a specified setpoint or within a specified range.

18. The system of claim 17, wherein the liquid is water.

19. The system of claim 18, wherein the processor detects the concentration level based on relative humidity.

20. The system of claim 17, wherein the processor detects the concentration level based on absolute humidity, dew point temperature and/or wet-bulb temperature.

21. The system of claim 17, wherein the liquid comprises a solvent.

22. The system of claim 17, wherein the liquid comprises water and a solvent other than water.

23. The system of claim 17, wherein the one or more sealant injection stations is a first injection station, the first injection station is configured to communicate with a second injection station and/or a central control and/or monitoring station.

\* \* \* \* \*